US012606455B2

(12) United States Patent
Yu et al.

(10) Patent No.: US 12,606,455 B2
(45) Date of Patent: Apr. 21, 2026

(54) PREPARATION METHOD OF TUNGSTEN-DOPED COBALT TETRAOXIDE AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yinghao Xie, Foshan (CN); Aixia Li, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 367 days.

(21) Appl. No.: 18/233,879

(22) Filed: Aug. 14, 2023

(65) Prior Publication Data

US 2023/0382761 A1     Nov. 30, 2023

Related U.S. Application Data

(63) Continuation of application No. PCT/CN2023/077220, filed on Feb. 20, 2023.

(30) Foreign Application Priority Data

Apr. 21, 2022     (CN) .......................... 202210421740.7

(51) Int. Cl.
C01G 51/42     (2025.01)
C01G 51/04     (2025.01)
(Continued)

(52) U.S. Cl.
CPC ............. *C01G 51/42* (2013.01); *C01G 51/04* (2013.01); *H01M 4/525* (2013.01);
(Continued)

(58) Field of Classification Search
CPC ...................................................... C01G 51/42
See application file for complete search history.

(56) References Cited

U.S. PATENT DOCUMENTS

2022/0109074 A1*   4/2022   Pesic ......................... H10D 1/62
2024/0389906 A1*  11/2024   Thors ................... A61B 5/1477

* cited by examiner

*Primary Examiner* — William D Young
(74) *Attorney, Agent, or Firm* — Westbridge IP LLC

(57) ABSTRACT

The present disclosure discloses a preparation method of tungsten-doped cobalt tetraoxide and use thereof. The preparation method includes the following steps: dissolving a tungsten-containing compound and a molybdenum-containing compound in an alkali liquid to obtain a mixed solution; concurrently feeding the mixed solution, a cobalt salt solution, and a complexing agent into a base solution to allow a reaction to obtain a precipitate; roasting the precipitate in an oxygen-containing atmosphere to obtain a roasted material; and soaking the roasted material in a sodium sulfide solution to obtain the tungsten-doped cobalt tetraoxide. In the present disclosure, tungsten is doped, and tungsten has a large atomic radius, which stabilizes an internal structure of the material, expands the ion channel, and improves the cycling performance of the material; and molybdenum is removed through a soaking process, which provides atomic vacancies to further improve a specific capacity of the material.

9 Claims, 1 Drawing Sheet

(51) Int. Cl.

| | |
|---|---|
| *H01M 4/02* | (2006.01) |
| *H01M 4/525* | (2010.01) |
| *H04N 19/103* | (2014.01) |
| *H04N 19/119* | (2014.01) |
| *H04N 19/129* | (2014.01) |
| *H04N 19/157* | (2014.01) |
| *H04N 19/169* | (2014.01) |
| *H04N 19/172* | (2014.01) |
| *H04N 19/174* | (2014.01) |
| *H04N 19/70* | (2014.01) |

(52) U.S. Cl.
CPC ......... *H04N 19/103* (2014.11); *H04N 19/119* (2014.11); *H04N 19/129* (2014.11); *H04N 19/157* (2014.11); *H04N 19/172* (2014.11); *H04N 19/174* (2014.11); *H04N 19/1883* (2014.11); *H04N 19/70* (2014.11); *C01P 2002/54* (2013.01); *C01P 2004/03* (2013.01); *C01P 2006/40* (2013.01); *H01M 2004/028* (2013.01)

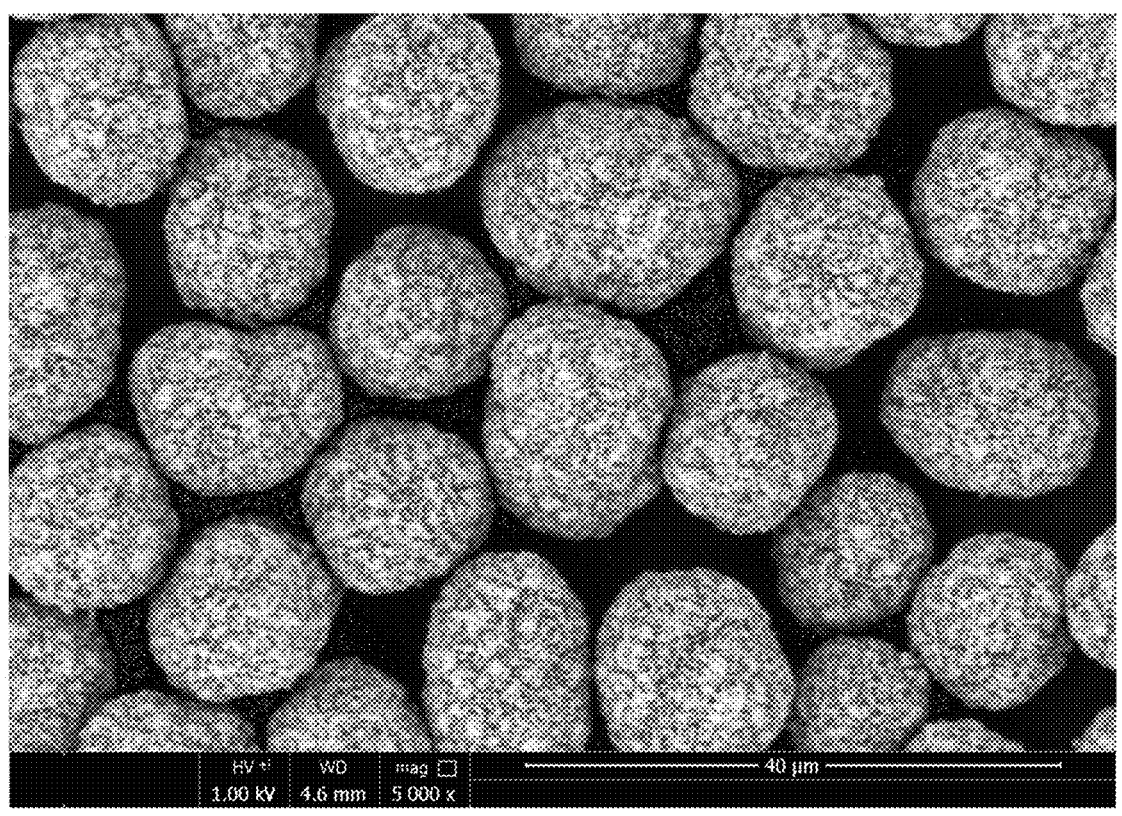

PREPARATION METHOD OF TUNGSTEN-DOPED COBALT TETRAOXIDE AND USE THEREOF

CROSS-REFERENCE TO RELATED APPLICATIONS

The present application is a continuation application of PCT application No. PCT/CN2023/077220 filed on Feb. 20, 2023, which claims the benefit of Chinese Patent Application No. 202210421740.7 filed on Apr. 21, 2022. The contents of all of the aforementioned applications are incorporated by reference herein in their entirety.

TECHNICAL FIELD

The present disclosure belongs to the technical field of lithium battery cathode material precursors, and particularly relates to a preparation method of tungsten-doped cobalt tetraoxide and use thereof.

BACKGROUND

With the iterative upgrade of digital products and the rapid development of various emerging electronic products such as high-end model aircraft and drones, there are increasingly high demands for lightweight and high-capacity lithium batteries. Lithium cobalt oxide (LCO) cathode materials have important applications in the digital field, and with the increasingly stringent requirements that electronic products placed on the performance of lithium batteries, the iterative upgrade of LCO cathode materials is particularly important. The performance of an LCO cathode material depends largely on the performance of a precursor thereof. Cobalt tetraoxide is mainly used as a precursor of LCO in the field of lithium-ion batteries (LIBs), and its performance is a key factor affecting the electrochemical performance of LCO. However, during the charging process of traditional LCO, lattices will change due to the deintercalation of lithium ions, which limits the capacity of the material. A major difficulty that needs to be solved right now is how to improve battery capacity, particularly the charging and discharging performance of lithium batteries at a high voltage. Studies have shown that the partial element doping of a material can not only improve the stability of lattices of the host material, but also greatly improve the cycling performance of a battery material.

Therefore, doping a cobalt tetraoxide material to improve the structural stability of a cathode material without affecting its electrical performance is a problem worthy of attention at present.

SUMMARY

The present disclosure is intended to solve at least one of the technical problems existing in the prior art. In view of this, the present disclosure provides a preparation method of tungsten-doped cobalt tetraoxide and use thereof. The tungsten-doped cobalt tetraoxide prepared by the preparation method has high structural stability, and a cathode material prepared thereby has prominent cycling performance.

According to an aspect of the present disclosure, a preparation method of tungsten-doped cobalt tetraoxide is provided, including the following steps:
    S1: dissolving a tungsten-containing compound and a molybdenum-containing compound in an alkali liquid to obtain a mixed solution;

S2: concurrently feeding the mixed solution, a cobalt salt solution, and a complexing agent into a base solution to react until a reaction material is at a target particle size; then, aging and conducting solid-liquid separation (SLS) to obtain a precipitate, where the base solution includes the mixed solution and ammonia water;
    S3: roasting the precipitate in an oxygen-containing atmosphere to obtain a roasted material; and
    S4: soaking the roasted material in a sodium sulfide solution during which a pH of the solution is adjusted to 7.2 to 8.5, and conducting SLS to obtain the tungsten-doped cobalt tetraoxide.

In some embodiments of the present disclosure, in S1, the alkali liquid may have a concentration of 4.0 mol/L to 10.0 mol/L.

In some embodiments of the present disclosure, in S1, the alkali liquid may be a sodium hydroxide solution.

In some embodiments of the present disclosure, in S1, a molar ratio of tungsten to molybdenum in the mixed solution may be 3:(1-3); and a total concentration of the tungsten and the molybdenum in the mixed solution may be 0.01 mol/L to 1.0 mol/L.

In some embodiments of the present disclosure, in S1, the tungsten-containing compound may be one or more selected from the group consisting of sodium tungstate, sodium metatungstate (SMT), ammonium tungstate, ammonium metatungstate (AMT), potassium tungstate, lithium tungstate, tungsten trioxide, and tungstic acid.

In some embodiments of the present disclosure, in S1, the molybdenum-containing compound may be one or more selected from the group consisting of sodium molybdate, sodium metamolybdate, ammonium molybdate, ammonium metamolybdate, potassium molybdate, lithium molybdate, molybdenum trioxide, and molybdic acid.

In some embodiments of the present disclosure, in S2, the cobalt salt solution may have a concentration of 1.0 mol/L to 2.0 mol/L.

In some embodiments of the present disclosure, in S2, the cobalt salt solution may be at least one selected from the group consisting of a cobalt sulfate solution, a cobalt nitrate solution, and a cobalt chloride solution.

In some embodiments of the present disclosure, in S2, the complexing agent may be ammonia water with a concentration of 6.0 mol/L to 12.0 mol/L.

In some embodiments of the present disclosure, in S2, the base solution may have a pH of 10 to 11 and an ammonia concentration of 5.0 g/L to 10.0 g/L.

In some embodiments of the present disclosure, in S2, the reaction may conducted at a pH of 10 to 11, a temperature of 55° C. to 65° C., and an ammonia concentration of 5 g/L to 10 g/L.

In some embodiments of the present disclosure, in S2, the reaction may be conducted at a stirring speed of 200 r/min to 500 r/min.

In some embodiments of the present disclosure, in S2, before the aging, the reaction material may have a target particle size D50 of 2.0 μm to 15.0 μm.

In some embodiments of the present disclosure, in S2, the aging may be conducted for 1 h to 2 h.

In some embodiments of the present disclosure, in S3, before the roasting, the precipitate may be further washed with water and dried; and the drying may be conducted at 100° C. to 120° C. for 4 h to 6 h.

In some embodiments of the present disclosure, in S3, the roasting may be conducted at 500° C. to 750° C. for 2 h to 6 h. Further, the oxygen-containing atmosphere may be created by air or oxygen.

In some embodiments of the present disclosure, in S4, a solid-to-liquid ratio of the roasted material to the sodium sulfide solution may be 1 g: (1-5) mL; and the sodium sulfide solution may have a concentration of 0.1 mol/L to 1 mol/L.

In some embodiments of the present disclosure, in S4, the soaking may be conducted at to 80° C. Further, the soaking may be conducted for 1 h to 3 h.

In some embodiments of the present disclosure, in S4, the pH of the solution may be adjusted with sodium hydroxide or sodium bisulfate.

In some embodiments of the present disclosure, in S4, after the SLS, the method may further include water-washing and drying the tungsten-doped cobalt tetraoxide; and the drying may be conducted at 80° C. to 120° C. for 2 h to 4 h.

The present disclosure also provides use of tungsten-doped cobalt tetraoxide prepared by the preparation method described above in the preparation of LCO or an LIB.

According to a preferred embodiment of the present disclosure, the present disclosure at least has the following beneficial effects:

1. In the present disclosure, a cobalt salt is subjected to a co-precipitation reaction with a tungsten- and molybdenum-containing alkaline solution and a complexing agent to prepare cobalt hydroxide doped with tungsten and molybdenum; after roasting, cobalt exists in the form of cobalt tetraoxide, whereas molybdenum and tungsten are doped into the cobalt tetraoxide in the form of trioxides. Finally, dissolve in sodium sulfide and control pH to selectively remove molybdenum. During this process, tungsten, which has a larger radius than molybdenum, is retained to obtain tungsten-doped cobalt tetraoxide. Chemical equations for the reactions are as follows:

Co-precipitation reaction:

$$Co^{2+}+2OH^-\rightarrow Co(OH)_2;\ and$$

$$Co^{2+}+xWO_4^{2-}+(1-x)MoO_4^{2-}\rightarrow Co(WO_4)_x(MoO_4)_{(1-x)}.$$

Roasting:

$$6Co(OH)_2+O_2\rightarrow 2Co_3O_4+6H_2O;\ and$$

$$6Co(WO_4)_x(MoO_4)_{(1-x)}+O_2\rightarrow 2Co_3O_4+6xWO_3+(6-6x)MoO_3.$$

Soaking:

$$MoO_3+4S^{2-}+3H_2O\rightarrow MoS_4^{2-}+6OH^-.$$

2. In the present disclosure, the co-doping of tungstate and molybdate (the valency of tungsten and molybdenum are both six in these salts) results in hydroxide anions inside cobalt hydroxide being replaced. The large atomic radii of tungsten and molybdenum stabilize the internal structure of cobalt hydroxide and expand the ion channel. In the soaking process, based on the principle that tungsten and molybdenum show different binding abilities to sulfur under different pH values, molybdenum with a slightly smaller atomic radius than tungsten is selectively removed, and tungsten with a larger radius is retained. This not only stabilizes the internal lattices of the material, but also provides atomic vacancies to further increase the specific capacity of the material. In the subsequent preparation of an LCO cathode material, tungsten stabilizes the lattice structure, further improves the cycling performance of the material, expands the ion channel, and improves the migration efficiency of lithium ions. Atomic vacancies left due to the removal of molybdenum atoms further improve the specific capacity of the material.

BRIEF DESCRIPTION OF THE DRAWINGS

The present disclosure is further described below with reference to accompanying drawings and examples.

The sole figure is a scanning electron microscopy (SEM) image of the tungsten-doped cobalt tetraoxide prepared in Example 1 of the present disclosure.

DETAILED DESCRIPTION

The concepts and technical effects of the present disclosure are clearly and completely described below in conjunction with examples, such as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

Tungsten-doped cobalt tetraoxide was prepared in this example, and a specific preparation process was as follows:

step 1. a cobalt sulfate solution with a concentration of 1.0 mol/L was prepared;

step 2. a sodium hydroxide solution with a concentration of 4.0 mol/L was prepared as a precipitating agent, and sodium tung state and sodium molybdate were added according to a tungsten-to-molybdenum molar ratio of 3:1 until the system was clear and had no precipitate to obtain a mixed solution in which a total concentration of tungsten and molybdenum was 0.01 mol/L;

step 3. ammonia water with a concentration of 6.0 mol/L was prepared as a complexing agent;

step 4. pure water was added to a reactor until a stirring paddle at a bottom was immersed, and then the mixed solution prepared in step 2 and the ammonia water prepared in step 3 were each added at a specified amount to prepare a base solution for starting a reaction, where the base solution had a pH of 10.7 and an ammonia concentration of 5.0 g/L;

step 5. the cobalt salt solution prepared in step 1, the mixed solution prepared in step 2, and the ammonia water prepared in step 3 were concurrently fed into the reactor to allow the reaction at a stirring speed of 200 r/min, a pH of 10.7, a temperature of 55° C., and an ammonia concentration of 5 g/L;

step 6. when it was detected that D50 of a resulting precipitate in the reactor reached 11.0 μm, the feeding was stopped and aging was conducted for 2 h;

step 7. the precipitate in the reactor was separated through SLS, washed with pure water, dried at 100° C. for 6 h, and roasted at 500° C. for 6 h in an air atmosphere to obtain a roasted material;

step 8. according to a solid-to-liquid ratio of 1 g : 1 mL, the roasted material was soaked in a 1 mol/L sodium sulfide solution at 70° C. for 3 h during which a pH of the solution was adjusted to 7.2 to 8.5 with sodium hydroxide or sodium bisulfate; and step 9. SLS was conducted, and a resulting solid was washed with deionized water and then dried at 80° C. for 4 h to obtain the tungsten-doped cobalt tetraoxide.

A scanning electron microscopy (SEM) image of the tungsten-doped cobalt tetraoxide was shown in the sole figure.

Example 2

Tungsten-doped cobalt tetraoxide was prepared in this example, and a specific preparation process was as follows:

step 1. a cobalt nitrate solution with a concentration of 1.5 mol/L was prepared;

step 2. a sodium hydroxide solution with a concentration of 8.0 mol/L was prepared as a precipitating agent, and ammonium tungstate and ammonium molybdate were added according to a tungsten-to-molybdenum molar ratio of 3:2 until the system was clear and had no precipitate to obtain a mixed solution in which a total concentration of hexavalent elements was 0.5 mol/L;

step 3. ammonia water with a concentration of 8.0 mol/L was prepared as a complexing agent;

step 4. pure water was added to a reactor until a stirring paddle at a bottom was immersed, and then the mixed solution prepared in step 2 and the ammonia water prepared in step 3 were each added at a specified amount to prepare a base solution for starting a reaction, where the base solution had a pH of 10.5 and an ammonia concentration of 8.0 g/L;

step 5. the cobalt salt solution prepared in step 1, the mixed solution prepared in step 2, and the ammonia water prepared in step 3 were concurrently fed into the reactor to allow the reaction at a stirring speed of 350 r/min, a pH of 10.5, a temperature of 60° C., and an ammonia concentration of 8 g/L;

step 6. when it was detected that D50 of a resulting precipitate in the reactor reached 9.0 μm, the feeding was stopped and aging was conducted for 2 h;

step 7. the precipitate in the reactor was separated through SLS, washed with pure water, dried at 110° C. for 5 h, and roasted at 600° C. for 4 h in an oxygen atmosphere to obtain a roasted material;

step 8. according to a solid-to-liquid ratio of 1 g: 3 mL, the roasted material was soaked in a 0.5 mol/L sodium sulfide solution at 75° C. for 2 h during which a pH of the solution was adjusted to 7.2 to 8.5 with sodium hydroxide or sodium bisulfate; and step 9. SLS was conducted, and a resulting solid was washed with deionized water and then dried at 100° C. for 3 h to obtain the tungsten-doped cobalt tetraoxide.

Example 3

Tungsten-doped cobalt tetraoxide was prepared in this example, and a specific preparation process was as follows:

step 1. a cobalt chloride solution with a concentration of 2.0 mol/L was prepared;

step 2. a sodium hydroxide solution with a concentration of 10.0 mol/L was prepared as a precipitating agent, and potassium tungstate and potassium molybdate were added according to a tungsten-to-molybdenum molar ratio of 3:3 until the system was clear and had no precipitate to obtain a mixed solution in which a total concentration of hexavalent elements was 1.0 mol/L;

step 3. ammonia water with a concentration of 12.0 mol/L was prepared as a complexing agent;

step 4. pure water was added to a reactor until a stirring paddle at a bottom was immersed, and then the mixed solution prepared in step 2 and the ammonia water prepared in step 3 were each added at a specified amount to prepare a base solution for starting a reaction, where the base solution had a pH of 10 and an ammonia concentration of 10.0 g/L;

step 5. the cobalt salt solution prepared in step 1, the mixed solution prepared in step 2, and the ammonia water prepared in step 3 were concurrently fed into the reactor to allow the reaction at a stirring speed of 500 r/min, a pH of 10, a temperature of 65° C., and an ammonia concentration of 10 g/L;

step 6. when it was detected that D50 of a resulting precipitate in the reactor reached 15.0 μm, the feeding was stopped and aging was conducted for 1 h;

step 7. the precipitate in the reactor was separated through SLS, washed with pure water, dried at 120° C. for 4 h, and roasted at 750° C. for 2 h in an oxygen atmosphere to obtain a roasted material;

step 8. according to a solid-to-liquid ratio of 1 g : 5 mL, the roasted material was soaked in a 0.1 mol/L sodium sulfide solution at 80° C. for 3 h during which a pH of the solution was adjusted to 7.2 to 8.5 with sodium hydroxide or sodium bisulfate; and step 9. SLS was conducted, and a resulting solid was washed with deionized water and then dried at 80° C. for 4 h to obtain the tungsten-doped cobalt tetraoxide.

Comparative Example 1

Cobalt tetraoxide was prepared in this comparative example, which was different from Example 1 in that no sodium tungstate and sodium molybdate was added. A specific preparation process was as follows:

step 1. a cobalt sulfate solution with a concentration of 1.0 mol/L was prepared;

step 2. a sodium hydroxide solution with a concentration of 4.0 mol/L was prepared as a precipitating agent;

step 3. ammonia water with a concentration of 6.0 mol/L was prepared as a complexing agent;

step 4. pure water was added to a reactor until a stirring paddle at a bottom was immersed, and then the sodium hydroxide solution prepared in step 2 and the ammonia water prepared in step 3 were each added at a specified amount to prepare a base solution for starting a reaction, where the base solution had a pH of 10.7 and an ammonia concentration of 5.0 g/L;

step 5. the cobalt salt solution prepared in step 1, the sodium hydroxide solution prepared in step 2, and the ammonia water prepared in step 3 were concurrently fed into the reactor to allow the reaction at a stirring speed of 200 r/min, a pH of 10.7, a temperature of 55° C., and an ammonia concentration of 5 g/L;

step 6. when it was detected that D50 of a resulting precipitate in the reactor reached 11.0 μm, the feeding was stopped and aging was conducted for 2 h; and step 7. the precipitate in the reactor was separated through SLS, washed with pure water, dried at 100° C. for 6 h, and roasted at 500° C. for 6 h in an air atmosphere to obtain the undoped cobalt tetraoxide.

Comparative Example 2

Cobalt tetraoxide was prepared in this comparative example, which was different from Example 2 in that no ammonium tungstate and ammonium molybdate was added. A specific preparation process was as follows:

step 1. a cobalt nitrate solution with a concentration of 1.5 mol/L was prepared;

step 2. a sodium hydroxide solution with a concentration of 8.0 mol/L was prepared as a precipitating agent;

step 3. ammonia water with a concentration of 8.0 mol/L was prepared as a complexing agent;

step 4. pure water was added to a reactor until a stirring paddle at a bottom was immersed, and then the sodium hydroxide solution prepared in step 2 and the ammonia water prepared in step 3 were each added at a specified amount to prepare a base solution for starting a reaction, where the base solution had a pH of 10.5 and an ammonia concentration of 8.0 g/L;

step 5. the cobalt salt solution prepared in step 1, the sodium hydroxide solution prepared in step 2, and the ammonia water prepared in step 3 were concurrently fed into the reactor to allow the reaction at a stirring speed of 350 r/min, a pH of 10.5, a temperature of 60° C., and an ammonia concentration of 8 g/L;

step 6. when it was detected that D50 of a resulting precipitate in the reactor reached 9.0 μm, the feeding was stopped and aging was conducted for 2 h; and step 7. the precipitate in the reactor was separated through SLS, washed with pure water, dried at 110° C. for 5 h, and roasted at 600° C. for 4 h in an oxygen atmosphere to obtain the undoped cobalt tetraoxide.

Comparative Example 3

Cobalt tetraoxide was prepared in this comparative example, which was different from Example 3 in that no potassium tungstate and potassium molybdate was added. A specific preparation process was as follows:

step 1. a cobalt chloride solution with a concentration of 2.0 mol/L was prepared;

step 2. a sodium hydroxide solution with a concentration of 10.0 mol/L was prepared as a precipitating agent;

step 3. ammonia water with a concentration of 12.0 mol/L was prepared as a complexing agent;

step 4. pure water was added to a reactor until a stirring paddle at a bottom was immersed, and then the sodium hydroxide solution prepared in step 2 and the ammonia water prepared in step 3 were each added at a specified amount to prepare a base solution for starting a reaction, where the base solution had a pH of 10 and an ammonia concentration of 10.0 g/L;

step 5. the cobalt salt solution prepared in step 1, the sodium hydroxide solution prepared in step 2, and the ammonia water prepared in step 3 were concurrently fed into the reactor to allow the reaction at a stirring speed of 500 r/min, a pH of 10, a temperature of 65° C., and an ammonia concentration of 10 g/L;

step 6. when it was detected that D50 of a resulting precipitate in the reactor reached 15.0 μm, the feeding was stopped and aging was conducted for 1 h; and step 7. the precipitate in the reactor was separated through SLS, washed with pure water, dried at 120° C. for 4 h, and roasted at 750° C. for 2 h in an oxygen atmosphere to obtain the undoped cobalt tetraoxide.

Comparative Example 4

Cobalt tetraoxide was prepared in this comparative example, which was different from Example 1 in that no sodium molybdate was added. A specific preparation process was as follows:

step 1. a cobalt sulfate solution with a concentration of 1.0 mol/L was prepared;

step 2. a sodium hydroxide solution with a concentration of 4.0 mol/L was prepared as a precipitating agent, and sodium tungstate was added until the system was clear and had no precipitate to obtain a mixed solution in which a concentration of tungsten was 0.0075 mol/L;

step 3. ammonia water with a concentration of 6.0 mol/L was prepared as a complexing agent;

step 4. pure water was added to a reactor until a stirring paddle at a bottom was immersed, and then the mixed solution prepared in step 2 and the ammonia water prepared in step 3 were each added at a specified amount to prepare a base solution for starting a reaction, where the base solution had a pH of 10.7 and an ammonia concentration of 5.0 g/L;

step 5. the cobalt salt solution prepared in step 1, the mixed solution prepared in step 2, and the ammonia water prepared in step 3 were concurrently fed into the reactor to allow the reaction at a stirring speed of 200 r/min, a pH of 10.7, a temperature of 55° C., and an ammonia concentration of 5 g/L;

step 6. when it was detected that D50 of a resulting precipitate in the reactor reached 11.0 μm, the feeding was stopped and aging was conducted for 2 h; and step 7. the precipitate in the reactor was separated through SLS, washed with pure water, dried at 100° C. for 6 h, and roasted at 500° C. for 6 h in an air atmosphere to obtain the tungsten-doped cobalt tetraoxide.

Test Example

The cobalt tetraoxide prepared in each of Examples 1 to 3 and Comparative Examples 1 to 4 was mixed with lithium carbonate in a Li:Co molar ratio of 1.06, and then subjected to high-temperature solid-phase sintering at 1,000° C. for 12 h in a pusher kiln to obtain an LCO cathode material.

The LCO cathode material obtained from each of the examples and comparative examples, acetylene black (as a conductive agent), and polyvinylidene fluoride (PVDF) (as a binder) were weighed and mixed in a ratio of 92:4:4, then a specified amount of an organic solvent N-methylpyrrolidone (NMP) was added, and a resulting mixture was stirred and coated on an aluminum foil to obtain a positive electrode sheet; and then with a metal lithium sheet as a negative electrode, a CR2430 button battery was assembled in an argon-filled glove box. An electrical performance test was conducted on a CT2001A Land test system under the following conditions: 3.0 V to 4.48 V, and a test temperature of 25±1° C. at 0.1 C. Test results were shown in Table 1.

TABLE 1

| | Electrochemical performance of LCO | |
| --- | --- | --- |
| | Discharge capacity at 0.1 C/4.48 V, mAh/g | Capacity retention after 600 cycles at 0.1 C/4.48 V |
| Example 1 | 216.3 | 84.1% |
| Example 2 | 218.7 | 83.8% |
| Example 3 | 217.2 | 83.7% |
| Comparative Example 1 | 185.7 | 74.6% |
| Comparative Example 2 | 186.1 | 72.1% |
| Comparative Example 3 | 185.8 | 75.4 |
| Comparative Example 4 | 188.7 | 82.6% |

It can be seen from Table 1 that the discharge capacity and cycling performance of each of the examples are both higher than that of each of the comparative examples. This is because tungsten is doped in the examples, and tungsten has a large atomic radius, which stabilizes an internal structure of the material, expands the ion channel, and improves the cycling performance of the material; and molybdenum is removed through a soaking process, which provides atomic vacancies to further improve a specific capacity of the material.

The examples of the present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples in the present disclosure and features in the examples may be combined with each other in a non-conflicting situation.

The invention claimed is:

1. A preparation method of a tungsten-doped cobalt tetraoxide, comprising the following steps:

S1: dissolving a tungsten-containing compound and a molybdenum-containing compound in an alkali liquid to obtain a mixed solution;

S2: concurrently feeding the mixed solution, a cobalt salt solution, and a complexing agent into a base solution to react until a reaction material is at a target particle size; then, agin and conducting solid-liquid separation (SLS) to obtain a precipitate, wherein the base solution comprises the mixed solution and ammonia water;

S3: roasting the precipitate in an oxygen-containing atmosphere to obtain a roasted material; and S4: soaking the roasted material in a sodium sulfide solution during which a pH of the solution is adjusted to 7.2 to 8.5, and conducting SLS to obtain the tungsten-doped cobalt tetraoxide.

2. The preparation method according to claim 1, wherein in S1, the alkali liquid has a concentration of 4.0 mol/L to 10.0 mol/L.

3. The preparation method according to claim 1, wherein in S1, a molar ratio of tungsten to molybdenum in the mixed solution is 3: (1-3); and a total concentration of the tungsten and the molybdenum in the mixed solution is 0.01 mol/L to 1.0 mol/L.

4. The preparation method according to claim 1, wherein in S1, the tungsten-containing compound is one or more selected from the group consisting of sodium tungstate, sodium metatungstate (SMT), ammonium tungstate, ammonium metatungstate (AMT), potassium tungstate, lithium tungstate, tungsten trioxide, and tungstic acid.

5. The preparation method according to claim 1, wherein in S1, the molybdenum-containing compound is one or more selected from the group consisting of sodium molybdate, sodium metamolybdate, ammonium molybdate, ammonium metamolybdate, potassium molybdate, lithium molybdate, molybdenum trioxide, and molybdic acid.

6. The preparation method according to claim 1, wherein in S2, the cobalt salt solution has a concentration of 1.0 mol/L to 2.0 mol/L.

7. The preparation method according to claim 1, wherein in S2, the base solution has a pH of 10 to 11 and an ammonia concentration of 5.0 g/L to 10.0 g/L.

8. The preparation method according to claim 1, wherein in S4, a solid-to-liquid ratio of the roasted material to the sodium sulfide solution is 1 g: (1-5) mL; and the sodium sulfidesolution has a concentration of 0.1 mol/L to 1 mol/L.

9. The preparation method according to claim 1, wherein in S4, the soaking is conducted at 70° C. to 80° C.

* * * * *